April 24, 1951  P. SIMONDS  2,549,989
CONSTANT PRESSURE MULTIPLE MOTOR HYDRAULIC
POWER TRANSMISSION SYSTEM
Filed Sept. 21, 1946
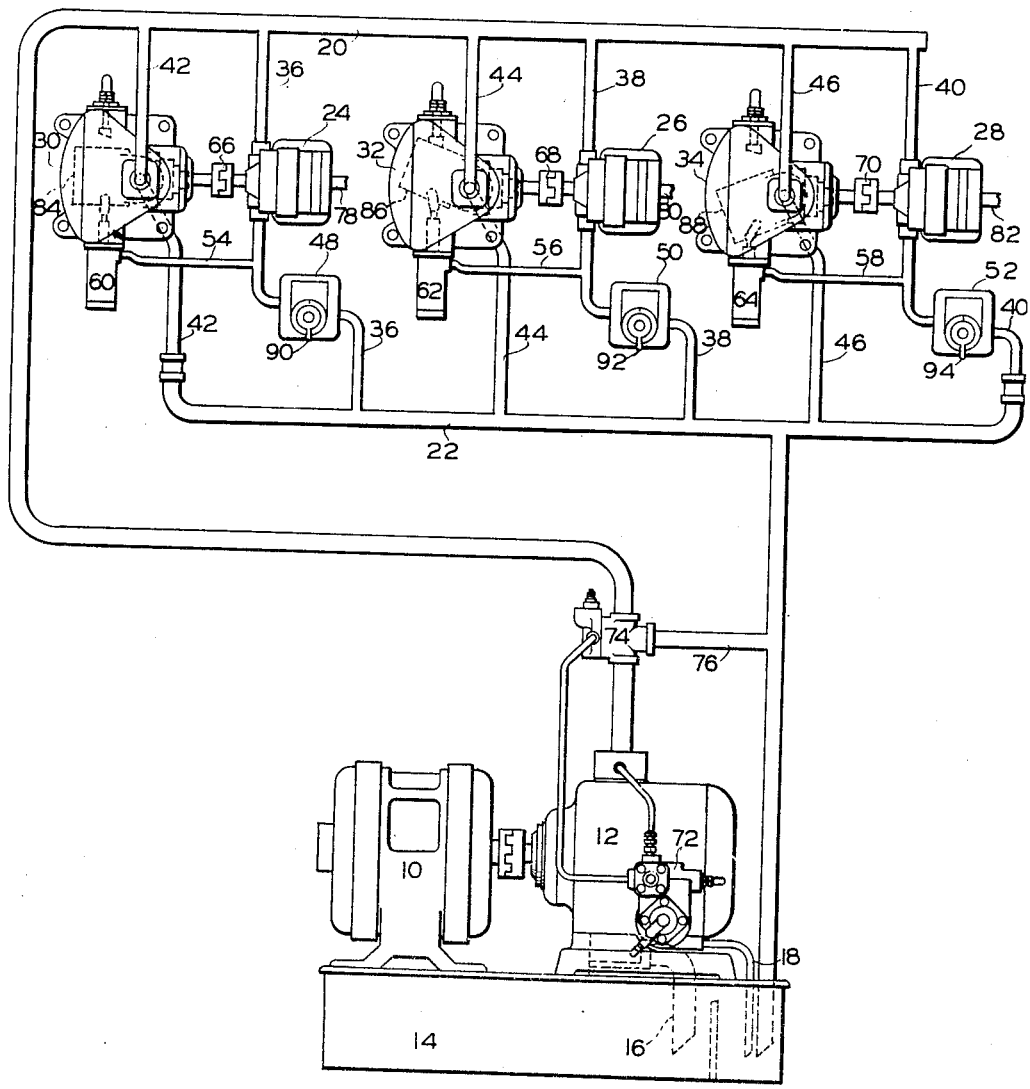
INVENTOR.
PAUL SIMONDS
BY
Ralph R. Tweedale
ATTORNEY Patented Apr. 24, 1951

2,549,989

UNITED STATES PATENT OFFICE 2,549,989

CONSTANT PRESSURE MULTIPLE MOTOR HYDRAULIC POWER TRANSMISSION SYSTEM

Paul Simonds, Shaker Heights, Ohio, assignor to Vickers Incorporated, Detroit, Mich., a corporation of Michigan Application September 21, 1946, Serial No. 698,450

12 Claims. (Cl. 60—53)

This invention relates to power transmissions, particularly to those of the type comprising two or more fluid pressure energy translating devices, one of which may function as a pump and another as a fluid motor.

The invention is more particularly concerned with transmissions employing a single source of pressure fluid supply and multiple motors driving their respective loads. In the textile industry and other types of continuous production machinery, several power take-offs are required at controlled speeds regardless of load. The proposed transmission has been designed to meet those requirements.

Therefore, one of the main objects of the invention is to provide a transmission having multiple controlled speed power take-off units.

The hydraulic transmission of the multiple drive type usually requires an excess capacity pump in order to provide for maximum load regardless of the fact that the load may vary considerably between the respective drives. In the proposed transmission, by coupling two motors together, their combined torque can be utilized for driving the load. At the same time, if one of the motors is also adapted to operate as a pump, it may be connected to impose additional loads on the other motor especially when the main load is light, thereby balancing the motor load and maintaining constant its output torque and speed.

Therefore, one of the objects of this invention is to provide multiple dual-motor drives wherein one of the motors is adapted to operate as a pump and oppose the other motor when the main load is light, thereby maintaining constant speed regardless of the fluctuation in the outside load.

When designing a circuit for multiple dual motor drives, consideration has to be given to the problem of equalizing the load on the fluid supply source pump. By hydraulically coupling the units in parallel across the pressure and return lines, when the one motor is driving the other motor as a pump during light loads, actually the operating pressure fluid utilized to drive the motor is recirculated or returned to the pressure conduit by the other motor functioning as a pump. Consequently, by a hydraulic feed-back, the power loss at no load is negligible and the normal demand by the multiple drive is reduced.

Another object is to provide a transmission employing multiple hydraulic feed-back drives for reducing and balancing the normal power requirements of the pressure fluid supply source.

The proposed transmission thereby combines the advantages of a single power source adapted to drive multiple load devices at their independently selected speeds without requiring excessive power supplies and adapted to maintain the selected speed constant regardless of load.

Further objects and advantages of the present invention will be apparent from the following description, reference being had to the accompanying drawing wherein a preferred form of the present invention is clearly shown.

In the drawing:

The single figure is a schematic diagram of the proposed circuit embodying a preferred form of the present invention.

In detail, the transmission includes a prime mover 10 coupled to a variable delivery pump 12 which in turn is connected to a tank 14 by a suction line 16 and drain line 18. Pressure and return lines 20 and 22, respectively, extend from the pump 12 to the multiple fixed displacement hydraulic motors 24, 26 and 28, and the variable displacement dual purpose motor-pumps 30, 32 and 34.

All motors are connected across the pressure and return conduits by branch lines 36, 38 and 40, and the motor-pump devices 30, 32 and 34 are connected to the pressure and return conduits by branch lines 42, 44 and 46, respectively. Flow control devices 48, 50 and 52 are provided in the motor branch lines 36, 38 and 40, respectively. Connected to the motor branch lines 36, 38 and 40 at a point between the motors 24, 26 and 28, and the flow control devices 48, 50 and 52, are pressure lines 54, 56 and 58 extending to the motor-pump compensators 60, 62 and 64, respectively, for controlling the variable motor-pump devices. The motors and motor-pump devices are mechanically connected by couplings 66, 68 and 70, respectively. The supply pump displacement is also controlled by an automatic compensator 72 which comprises a piston linked to the pump yoke and provided with resilient means such as a spring for normally shifting the yoke to its maximum displacement position. As the delivery pressure increases and is communicated to the compensator piston, it opposes the spring and tends to move the pump yoke toward its neutral position and thus reduce the pump displacement. The volume of fluid delivered by the pump automatically varies to maintain a constant pressure in the conduit 20 by the control of the automatic compensator 72. The pressure conduit 20 is provided with a relief valve 74 having a discharge line 76 communicating with the tank 14 via line 22.

The operating speed of each motor is determined by the setting of the flow control device located at the outlet of each motor.

The flow control devices 48, 50, and 52 may comprise a combination throttle and compensating valve or a variable throttle alone. The combination throttle and compensating valve give a more accurate control but a variable throttle in the motor branch lines 36, 38, and 40 may regulate the flow sufficiently for accurate control. The compensating valves of the flow control devices 48, 50, and 52 are in the form of a pressure balanced piston valve actuated by the difference in pressures ahead of and beyond the throttle. The pressure drop across the throttle is maintained constant by a predetermined spring pressure. The rate of flow is regulated by the variable throttle and since only the flow from the fixed displacement motor goes through the flow control valve the speed of each motor is consequently maintained for any given valve setting. Thus, the operator may selectively vary the speeds of the load shafts 78, 80, and 82 by merely regulating the throttle control handles 90, 92, and 94, respectively, of the flow control devices 48, 50, and 52.

Each dual motor drive is adapted to actuate a variable load at a constant speed against a variable load torque within the design limits of the transmission. When the load on a fixed displacement motor is low the motor-pump unit associated therewith is automatically operated as a pump creating a torque load which must be driven by the motor. When the load on a fixed displacement motor is high the motor-pump unit associated therewith is automatically operated as a motor, the torque output of which is added to the torque output of the fixed displacement motor in driving the high load. When the load is approximately at the mid-point of the load range, the fixed motor alone drives the load and the motor-pump unit functions neither as a pump nor as a motor.

The compensator units of the motor-pump units are adapted to be sensitive to slight increases and decreases of pressure at the motor outlets ahead of the flow control devices in order to regulate the motor-pump yokes. Compensator units for regulating the displacement of fluid energy translating devices of the type disclosed are well known in the art and may contain a spring biased pressure operated piston, the latter of which is linked to the yoke for normally maintaining the yoke in a maximum displacement position on one side of neutral. Thus, by proper design of the spring the pressure differential between maximum displacement on each side of the neutral position of the yoke may be accurately predetermined. Thus, with a system designed 1,000 p. s. i. pump pressure a spring for the compensators may be provided which will maintain the yoke in the maximum motor displacement position as shown in the motor-pump unit 32 and which will be responsive, for example, to increases of 50 p. s. i. to shift the same to the maximum pump displacement position shown in the motor-pump unit 28. Thus, if the pressures were to range between 10 p. s. i. and 60 p. s. i. between the motor outlets and the flow control devices a pressure of 35 p. s. i. would maintain the motor-pump yoke in the neutral position shown in the motor-pump unit 30. In general, the lighter the spring and the narrower the differential between the pressures necessary to shift the yoke through its full stroke the more efficient the transmission will be.

As previously stated, the compensators are sensitive to slight increases and decreases of pressure at the motor outlets ahead of the flow control devices. The pressure at the motor outlet is dependent upon the pressure drop across the motor. If the load is high substantially all of the constant pressure maintained at the motor inlet is utilized in driving the load device and the pressure at the outlet of the motor tends to be low. If the load is at the low limit of the load range the pressure at the outlet of the motor tends to be high.

In operation, the pump 12 delivers liquid through the conduit 20 at a constant pressure at whatever rate the motors use the liquid at that predetermined constant pressure. Thus, the quantity delivered will vary dependent upon the total amount used by all of the motors but the pressure will remain constant.

Motor 26 is shown in the drawing driving a load adapted to be the highest load within the load range of the drive. With the pressure at the inlets of the motors 26 and 32 remaining constant, substantially all of their torque capacity is required to overcome the load and the pressure at the outlet of motor 26 will accordingly be low.

Should the load decrease from the high point of the load range the pressure at the outlet side of the motor 26 tends to increase and this increase in pressure causes the compensator unit of the motor-pump unit to shift the yoke mechanism of said unit towards the neutral position to decrease its torque output and thus reduce the total torque of the two units to the decreased value of the load.

As illustrated in the drawing by the motor unit 24 and the motor-pump unit 30 when the load is substantially at the mid-point of the load range the pressure at the outlet side of the motor 24 is at a value which maintains the yoke mechanism in the neutral position (e. g. 35 p. s. i.). Under this operating condition the motor-pump device functions neither as a pump nor as a motor. The motor 24 is carrying the entire load.

As the load decreases from the mid-point to the low point of the range the pressure at the outlet side of the motor tends to increase further and the compensator unit will shift the yoke mechanism to the other side of neutral, that is to the pumping position. When operating as a pump the fluid supply for the same is furnished from the conduit 22 and the tank 14. Any tendency to increase the pressure in the conduit 20, because of the displacement into the conduit 20 from the motor-pump unit 34 acting as a pump, is compensated for by the main pump compensator 72, in that the displacement of the pump 12 will decrease in an amount necessary to maintain the pressure constant in the conduit 20.

The motor-pump unit operating as a pump must deliver its fluid displacement into conduit 20 which is maintained at a constant pressure so that a torque load will be imposed upon the motor driving it as a pump. As the yoke of the motor-pump unit is shifted further from the neutral position its required driving torque increases and consequently the load on the motor driving it as a pump will increase. As illustrated by the motor 28 and the motor-pump unit 34, the load on the motor 28 is at the low point of the load range. The pressure at the motor outlet has increased to its maximum (e. g. 60 p. s. i.) and caused the compensator unit 64 to shift the yoke mechanism 88 of the motor-pump unit 34 to the maximum displacement position. Its full torque load resistance has thus been added to the extremely low outside load on the motor 28. Here the imposed load of the pump 34 has been substituted for the decrease in the actual load removed from the motor 28.

Each motor-pump unit automatically cooperates for a decrease or increase of load on its associated fixed motor. As the load increases from the mid-point of the load range to the maximum point of the load range the pressure at the outlet side of the motor tends to decrease and the compensator unit automatically increases the torque output of the motor-pump unit operating as a motor to compensate for the increase in load for balancing the same and maintaining constant speed.

As the load decreases from the mid-point of the load range to the minimum point the tendency for the pressure to further increase at the motor outlet automatically causes the compensator unit to increase the displacement and driving torque of the motor-pump unit operating as a pump for balancing the load and maintaining constant speed.

If, at any time, as illustrated, the load on one of the motors is extremely high and the load on one of the other motors is extremely low the overall power demands remain the same. In this case the motor-pump unit operating as a pump assists the main pump in supplying the additional power required to overcome the load imposed on the motor driving its associated motor-pump unit as a motor.

The system has been described as if the fixed displacement motors 24, 26, and 28 had substantially the same displacement as the variable displacement motor-pump units 30, 32, and 34, respectively, with which they are paired. When the dual motor units are of substantially equal displacements the fixed displacement motor is the main driving motor over most of the load range. The load is shared equally at the high point of the load range but as the load decreases the fixed displacement motor assumes a greater proportion of the load. From the mid-point to the lowest point of the load range the fixed displacement motor drives the entire load plus the torque load created by the variable displacement motor unit operating as a pump.

However, operativeness of the system does not depend upon equal rated displacements of the dual motor units. Although it is desirable to have dual motor units of substantially equal displacements for achieving maximum efficiency at the lowest overall cost, the rated displacements of the dual motor units may be different without changing the function of the transmission. Thus, a variable displacement motor may be paired with a fixed displacement motor of less displacement and torque capacity than the variable displacement motor, in which case, the variable displacement motor assumes a greater portion of the load over a predetermined upper portion of the load range.

The rated displacements of the dual motors may be so different that a dual drive is provided wherein the variable displacement motor unit may be caused to drive the load over nearly the entire designed load range while the fixed displacement motor is so small that its torque is negligible and its principal function is for control purposes.

No matter what the relative displacements of the motor units, the displacement of the variable displacement motor unit is varied with changes in load to maintain constant output torque and speed of the dual drive. However, it should be noted that whatever the relative displacement of the dual motor units the fixed displacement motor performs the function of a control motor over the entire load range.

The control motor is one element of a metering circuit branch which is connected to the pressure supply source and the variable displacement motor unit in such a manner that the elements of the entire system coact to produce a constant speed dual drive with variable output torque. For example, one metering circuit branch of the multiple dual drive system comprises the conduit 36 connected to the pressure supply conduit 20 and the return conduit 22, the fixed displacement motor unit 24, the flow control valve 48 incorporated in the conduit 36, and the branch conduit 54 connecting the conduit 36 between the motor 24 and the flow control valve 48 to the compensator 60 of the variable displacement motor unit 30.

The fixed displacement motor unit in the metering circuit branch is the main driving motor over most of the load range when the displacements of the dual units are substantially equal. As the displacement of the variable displacement motor unit is increased relative to that of the fixed displacement motor unit, the former motor unit drives a greater portion of the load over a greater portion of the load range. As previously recited, the displacement of the variable displacement motor unit may be chosen so great relative to that of the fixed displacement motor unit that the variable displacement motor unit may drive substantially the entire load over an entire predetermined load range while the function of the fixed displacement motor over the entire load range is primarily that of a control motor although it does also function as a drive motor within its own torque capacity.

It will thus be seen that the present invention has provided a transmission particularly suitable for multiple loads operating independently at constant speeds. This is accomplished by mechanically coupling a variable motor-pump unit to a motor and hydraulically connecting a plurality of such dual units in parallel. By providing a flow control in the motor branch with pressure responsive means for varying the motor-pump unit, constant predetermined speed may be maintained regardless of load functions within the limits of the transmission.

While the form of embodiment of the invention as herein disclosed constitutes a preferred form, it is to be understood that other forms might be adopted, all coming within the scope of the claims which follow.

What is claimed is as follows:

1. A hydraulic transmission including means forming a variable volume, constant pressure, fluid source, pressure and return conduits connected to the source, a main hydraulic motor connected to the pressure and return conduits for driving an external load, and an auxiliary control circuit comprising a combination auxiliary motor-pump device mechanically coupled to the main motor and hydraulically connected in parallel with the main motor to the pressure and return conduits, and means responsive to motor speeds for automatically adjusting the auxiliary motor-pump to make it function as a pump and brake the motor when its speeds are above normal or to make it function as an auxiliary motor and assist the main motor when its speeds are below normal.

2. A hydraulic transmission including means forming a variable volume, constant pressure, fluid source, pressure and return conduits connected to the source, a main hydraulic motor connected to the pressure and return conduits for driving an external load, and an auxiliary control circuit comprising a combination auxiliary motor-pump device mechanically coupled to the main motor and hydraulically connected in parallel with the main motor to the pressure and return conduits, and pressure controlled means responsive to changes in the external loads for automatically adjusting the auxiliary motor-pump and causing the latter to oppose or assist the main motor in maintaining a constant speed.

3. A hydraulic transmission including means forming a variable volume, constant pressure, fluid source, pressure and return conduits connected to the source, a main hydraulic motor for driving an external load and connected to the pressure and return conduits, a flow control device in series with the motor, and an auxiliary control circuit comprising a combination auxiliary motor-pump device mechanically coupled to the motor and hydraulically connected in parallel with the motor to the pressure and return conduits, and means controlled by pressure in the conduit connecting the main motor and flow control device for selectively adjusting the motor-pump device to operate as a pump or a motor and maintain constant output speeds of the transmission.

4. A hydraulic transmission including means forming a variable volume, constant pressure, fluid source, pressure and return conduits connected to the source, a main hydraulic motor for driving an external load and connected to the pressure and return conduits, a flow control device in series with the motor, and an auxiliary control circuit comprising a combination auxiliary motor-pump device mechanically coupled to the motor and hydraulically connected in parallel with the motor to the pressure and return conduits, and pressure controlled means responsive to the pressure drop across the main motor for selecting the motor-pump device function of assisting or braking the main motor torque and maintaining constant output speed.

5. A speed control for a hydraulic transmission employing a constant pressure variable delivery pump hydraulically connected by pressure and return conduits to a variable displacement motor provided with a pressure controlled compensator for automatically varying the motor torque output, including a metering circuit branch hydraulically connected to the pressure and return conduits in parallel with the variable displacement motor and to the compensator thereof, said metering circuit branch comprising a control motor mechanically coupled to the output shaft of the variable displacement motor and a flow control device, said compensator being responsive to changes in pressure drop through the control motor for increasing or decreasing the output torque of the variable displacement motor and maintaining constant speeds.

6. A speed control for a hydraulic transmission employing a constant pressure variable delivery pump hydraulically connected by pressure and return conduits to a variable displacement motor provided with a pressure controlled compensator for automatically varying the motor torque output, including a metering circuit branch hydraulically connected to the pressure and return conduits in parallel with the variable displacement motor, said metering circuit branch comprising a control motor mechanically coupled to the output shaft of the variable displacement motor, a flow control device, and a pressure conduit connecting the metering branch conduit between the control motor and flow control device to the variable motor compensator for balancing the output torque and load requirements and maintaining constant speed.

7. A constant speed control for a variable load hydraulic transmission employing pressure and return conduits connected to a constant pressure variable delivery pressure fluid supply, a variable displacement motor and a fixed displacement motor mechanically coupled together to a common load device and hydraulically connected in parallel to the pressure and return conduits, a flow control device connected in series with the fixed displacement motor for selectively controlling the volumetric discharge rate and normal motor speed, and pressure actuated means responsive to changes in pressure drop across the fixed displacement motor and adapted to adjust the variable displacement motor output torque for balancing the load requirements and maintaining constant output speed.

8. A hydraulic transmission employing multiple, constant speed, hydraulic power drives connected in parallel to pressure and return conduits from a variable volume, constant pressure, fluid supply source, each drive comprising two motors mechanically coupled in unison to a load device and hydraulically connected in parallel to the pressure and return lines, a flow control device connected in series with one of the motors, and pressure actuated means responsive to the pressure drop across that motor for controlling the output torque of the other motor and maintaining constant speed.

9. A hydraulic transmission employing multiple, constant speed, hydraulic power drives connected in parallel to pressure and return conduits from a variable volume, constant pressure, fluid supply source, each drive comprising a pump and a motor mechanically coupled in unison to a load device and hydraulically connected in parallel to the pressure and return lines, a flow control device connected in series with the motor, and pressure actuated means responsive to the pressure drop across the motor for controlling the torque load created by the pump, thereby balancing the load requirements and maintaining constant speed.

10. A hydraulic transmission employing multiple, constant speed, hydraulic power drives connected in parallel to pressure and return conduits from a constant pressure fluid supply source, each drive comprising a fixed displacement motor and a variable displacement motor-pump device mechanically coupled in unison to a load device and hydraulically connected in parallel to the pressure and return lines, a flow control device connected in series with the motor, and pressure actuated means responsive to the pressure drop across the motor for controlling the operation of the motor-pump device whereby it functions as a motor to assist the fixed displacement motor when the torque load is high or as a pump to brake the motor when the torque load is small, thereby maintaining constant speed.

11. In a hydraulic transmission employing a fixed displacement motor connected to the pressure and return conduits of a constant pressure fluid supply source, a control for maintaining the motor output speed and torque constant, comprising a variable displacement, reverse flow motor-pump device mechanically coupled to the fixed displacement motor and hydraulically connected to the pressure and return conduits in parallel with the motor-pump device, a flow control valve in series with the fixed displacement motor, and pressure actuated means responsive to changes in pressure in the conduit connecting the motor and flow control valve for varying the displacement and direction of flow of the fluid through the motor-pump device, thereby selectively controlling its function as a motor or pump to balance the torque load on the motor and maintain constant speed.

12. In a hydraulic transmission employing a fixed displacement motor connected to the pressure and return conduits of a constant pressure fluid supply source, a control for maintaining the motor output speed and torque constant, comprising a variable displacement, reverse flow motor-pump device mechanically coupled to the fixed displacement motor, a flow control valve in series with the fixed displacement motor, pressure actuated means responsive to changes in pressure in the conduit connecting the motor and flow control valve for varying the displacement and direction of flow of the fluid through the motor-pump device, thereby selectively controlling its function as a motor or pump to balance the torque load on the motor and maintain constant speed, and conduits hydraulically connecting the motor-pump device in parallel with the supply pump and fixed displacement motor, whereby its operation as a pump assists the supply pump and its operation as a motor assists the fixed displacement motor.

PAUL SIMONDS.

REFERENCES CITED

The following references are of record in the file of this patent:

UNITED STATES PATENTS

| Number | Name | Date |
|---|---|---|
| 2,291,011 | Vickers | July 28, 1942 |
| 2,360,598 | Tyler | Oct. 17, 1944 |
| 2,389,829 | Tyler | Nov. 27, 1945 |